US009052833B2

(12) United States Patent
Petersen et al.

(10) Patent No.: US 9,052,833 B2
(45) Date of Patent: Jun. 9, 2015

(54) PROTECTION OF FORMER PRIMARY VOLUMES IN A SYNCHRONOUS REPLICATION RELATIONSHIP

(71) Applicant: International Business Machines Corporation, Armonk, NY (US)

(72) Inventors: David B. Petersen, Great Falls, VA (US); Gail A. Spear, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 271 days.

(21) Appl. No.: 13/792,794

(22) Filed: Mar. 11, 2013

(65) Prior Publication Data
US 2014/0258659 A1  Sep. 11, 2014

(51) Int. Cl.
*G06F 3/06* (2006.01)

(52) U.S. Cl.
CPC .............. *G06F 3/065* (2013.01); *G06F 3/062* (2013.01); *G06F 3/0622* (2013.01)

(58) Field of Classification Search
CPC ........ G06F 3/065; G06F 3/062; G06F 3/0622
See application file for complete search history.

(56) References Cited

U.S. PATENT DOCUMENTS

| 2005/0071708 A1 | 3/2005 | Bartfai et al. | |
|---|---|---|---|
| 2009/0037676 A1 | 2/2009 | Coronado et al. | |
| 2009/0313428 A1 | 12/2009 | De Jong | |
| 2012/0092986 A1* | 4/2012 | Chen | 370/228 |
| 2012/0226877 A1 | 9/2012 | Clayton et al. | |

FOREIGN PATENT DOCUMENTS

| JP | 11259348 | 1/1999 |
|---|---|---|
| WO | WO0167247 | 9/2001 |

OTHER PUBLICATIONS

N. Dhondy, et al., "GDPS: The e-business Availability Solution," Mar. 2005, 30 pages.
C. Brooks, et al., "IBM System Storage Business Continuity Solutions Overview," IBM, International Technical Support Organization, Feb. 2007, 190 pages.
RD455174A Research Disclosure, "Emergency failsafe shutdown and data preservation method for personal computer used in building, involves sending message alerting both user and operator, and message to perform remote copy to storage system," Mar. 10, 2002, 1 page.
P. Rogers, et al., "z/OS Version 1 Release 3 and 4 Implementation," IBM, International Technical Support Organization, Jun. 2003, 474 pages.

* cited by examiner

*Primary Examiner* — John Lane
(74) *Attorney, Agent, or Firm* — Cantor Colburn LLP; William A. Kinnaman, Jr.

(57) ABSTRACT

An aspect includes protecting a former primary volume in a synchronous replication relationship. A swap between a primary volume at a first site and a secondary volume at a second site is initiated such that the secondary volume becomes a new primary volume and the primary volume becomes the former primary volume. A fenced state is set as active for the former primary volume. The former primary volume is configured as a fenced volume based on the fenced state being active. Read and write access to the fenced volume is blocked while the fenced state is active.

20 Claims, 4 Drawing Sheets

PROTECTION OF FORMER PRIMARY VOLUMES IN A SYNCHRONOUS REPLICATION RELATIONSHIP

BACKGROUND

The present invention relates to computer storage systems and, more specifically, to protecting former primary volumes in a synchronous replication relationship.

High-reliability storage systems typically use data replication to maintain a secondary copy of data stored in a primary volume. A systems complex, also referred to as a sysplex, is an example of a high-reliability system that allows multiple logical partitions to communicate and coordinate synchronized data storage and access for large-scale data storage and management. A parallel sysplex provides data sharing capabilities for accessing multiple databases to read and write as shared data. System members are synchronized using timers and a coupling facility for data sharing. A geographically dispersed parallel sysplex (GDPS*) environment enables a parallel sysplex to be at geographically separate sites while maintaining coordinated data system management; however, the GDPS environment need not be geographically separated. A GDPS environment in combination with peer-to-peer remote copy (GDPS/PPRC) enables synchronous data mirroring using PPRC volume pairs (i.e., primary and secondary volumes) for systems that can be separated by substantial distances, e.g., 120 miles. PPRC is an example of a synchronous replication technology. In a two system configuration, GDPS/PPRC allows the systems at separate sites to be administered as a single system. In the event of a system or storage device failure, recovery can be initiated automatically with minimal or no data loss.

Swapping between primary and secondary volumes can be performed using various support features in a high-reliability storage system. A HyperSwap* operation in a GDPS system is one example of a swapping function. The HyperSwap operation can help significantly reduce the time needed to switch to secondary PPRC volumes (i.e., a mirrored set of disks) that hold a copy of data from primary PPRC volumes while keeping the underlying operating system active together with associated applications. A HyperSwap manager automates the process of making the secondary PPRC volumes become the primary PPRC volumes with minimal to no disruption to applications running in the GDPS system. In a HyperSwap environment when there is an error that triggers an unplanned HyperSwap operation, the GDPS system will typically perform the HyperSwap operation in all of the members of the sysplex. After the HyperSwap operation there are several exposures to system images using the former primary PPRC volumes. For a planned or unplanned HyperSwap operation, PPRC pairs can be reestablished in the reverse direction using a PPRC failover function. This can result in the former primary PPRC volumes remaining accessible. For example, any system accessing the former primary PPRC volumes will read data that could be stale, and any updates to the former primary PPRC volumes will be lost when the PPRC pairs are reestablished in the reverse direction. (* GDPS and HyperSwap are trademarks or registered trademarks of International Business Machines Corporation.)

SUMMARY

According to an aspect of the present invention, a method for protecting a former primary volume in a synchronous replication relationship is provided. A swap between a primary volume at a first site and a secondary volume at a second site is initiated such that the secondary volume becomes a new primary volume and the primary volume becomes the former primary volume. A fenced state is set as active for the former primary volume. The former primary volume is configured as a fenced volume based on the fenced state being active. Read and write access to the fenced volume is blocked while the fenced state is active.

According to another aspect of the present invention, a system for protecting a former primary volume in a synchronous replication relationship is provided. The system includes a storage controller at a first site coupled to a primary volume designated as the former primary volume upon a swap to a secondary volume at a second site. Fencing control logic is configured to establish the former primary volume as a fenced volume based on a fenced state being active. The fencing control logic is also configured to block read and write access to the fenced volume while the fenced state is active.

According to a further aspect of the present invention, a computer program product for protecting a former primary volume in a synchronous replication relationship is provided. The computer program product includes a tangible storage medium readable by a processing circuit and storing instructions for execution by the processing circuit for performing a method. The method includes setting a fenced state as active for the former primary volume at a first site upon a swap to a secondary volume at a second site. The former primary volume is configured as a fenced volume based on the fenced state being active. Read and write access to the fenced volume is blocked while the fenced state is active.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments relate to protecting former primary volumes in a synchronous replication relationship. To support data replication or mirroring, data storage devices, which are referred to as volumes herein, are configured in pairs as primary and secondary volumes. A synchronous replication relationship can be established between primary and secondary volumes such that a write operation to a primary volume triggers a corresponding write to the secondary volume. The secondary volume provides an acknowledgement of the write operation, which in turn results in an acknowledgement from the primary volume to a requestor of the write operation when the primary volume also completes the write operation. In a cluster that establishes a synchronous replication relationship between primary and secondary volumes, a number of events can result in a failover whereby the secondary volumes become the primary volumes. In many cases, such as controlled accesses within the cluster, access to the former primary volumes is prevented. However, there may be situations where the former primary volumes remain accessible. Use of the former primary volumes can lead to problems if the underlying data is out of sync with the new primary volumes or if data is written to the former primary volumes. Exemplary embodiments provide fencing control logic to block access to former primary volumes. The fencing control logic may also provide for fence removal from the former primary volumes as part of resynchronization and for cases where intentional access is needed, such as diagnostic, maintenance, and repair actions.

A systems complex (sysplex) is an example of a cluster that can include a number of computer systems, such as mainframes, that control access to storage subsystems for managing large volumes of data. A geographically dispersed parallel sysplex (GDPS*) environment that supports parallel operations with data mirroring between primary peer-to-peer remote copy (PPRC) volumes and secondary PPRC volumes is an example of a cluster that supports synchronous replication relationships which may be implemented in accordance with exemplary embodiments.

Figure 1:
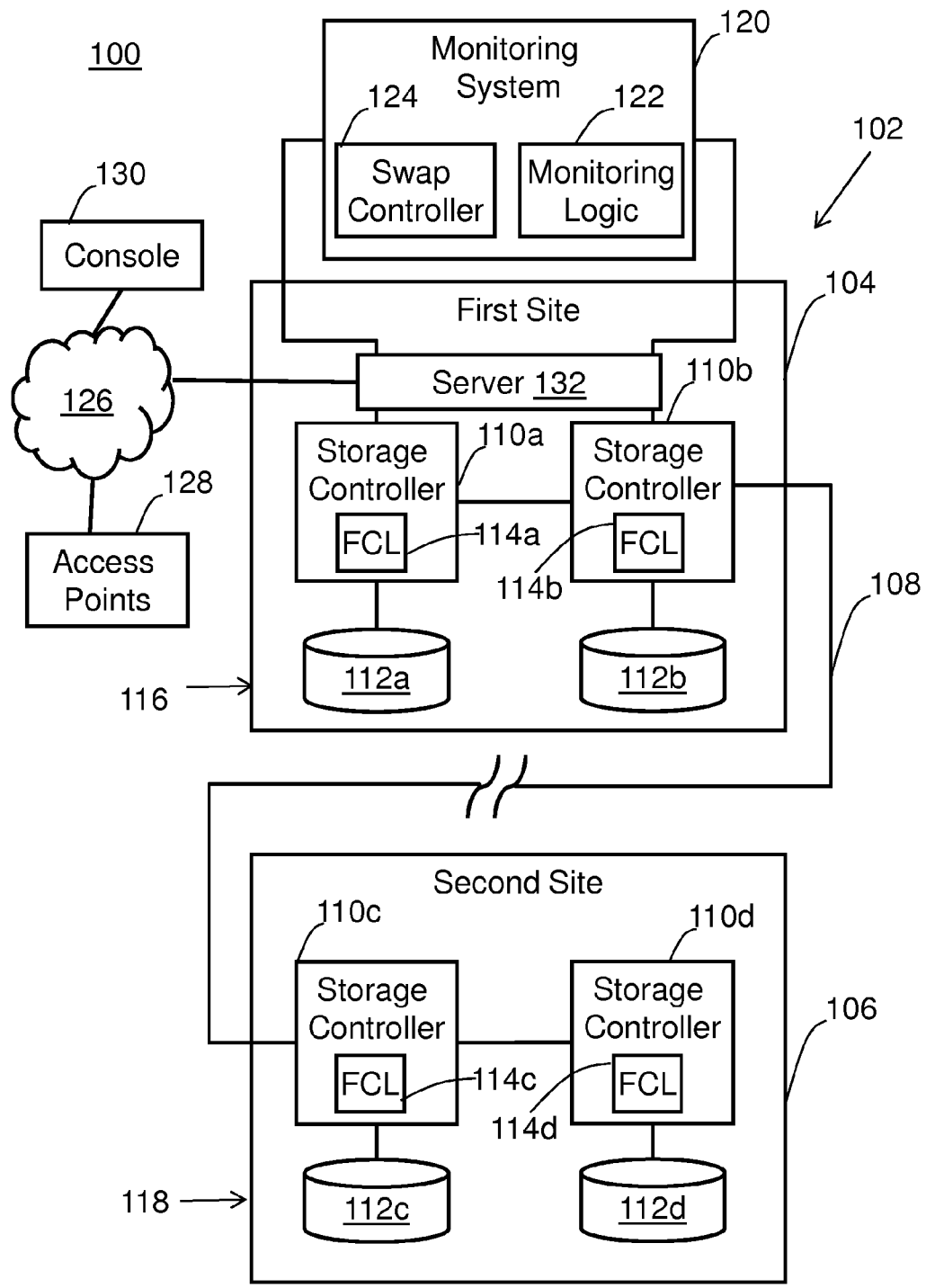
FIG. 1 depicts a block diagram of a cluster including volumes in a synchronous replication relationship that may be implemented according to an embodiment.

Turning now to FIG. 1, an example of a system 100 including a cluster 102 will now be described in greater detail. The cluster 102 includes a first site 104 and a second site 106. The first site 104 and the second site 106 may be separated geographically, for example, by up to one hundred twenty miles apart, or they may be logically separated at a same geographic location. A link 108 provides a communication path between the first site 104 and the second site 106. The link 108 may include multiple fiber-optic waveguides for redundancy. The first site 104 can include one or more storage controllers that control access to one or more volumes respectively. Similarly, the second site 106 can also include one or more storage controllers and one or more volumes. The example of FIG. 1 depicts a pair of storage controllers 110a and 110b coupled respectively to volumes 112a and 112b at the first site 104, and a pair of storage controllers 110c and 110d coupled respectively to volumes 112c and 112d at the second site 106. The volumes 112 are data storage devices that can be grouped into logical subsystems. While the example of FIG. 1 only depicts two storage controllers 110 and volumes 112 per site, it will be understood that the first site 104 and the second site 106 can include a large number of storage controllers 110 and volumes 112 in a variety of configurations.

Each of the storage controllers 110a, 110b, 110c, and 110d can also include corresponding fencing control logic 114a, 114b, 114c, and 114d. In the example of FIG. 1, the volumes 112a and 112b of the first site 104 are configured as primary volumes 116, and the volumes 112c and 112d of the second site 106 are configured as secondary volumes 118 in a synchronous replication relationship. In an exemplary embodiment, a monitoring system 120 monitors performance at the first site 104 and the link 108 to determine whether a condition exists such that the secondary volumes 118 should become primary. The monitoring system 120 can include monitoring logic 122 and a swap controller 124 to manage swapping of the primary volumes 116 to the secondary volumes 118. In alternate embodiments, the monitoring logic 122 is omitted or unused, and scripts or manual actions are used to initiate swapping. Swapping can be planned or unplanned.

The cluster 102 can also interface to one or more networks 126 such that access points 128 and/or a console 130 can access data in the cluster 102. The access points 128 are computer systems that may interface to a server 132 of the cluster 102. The server 132 interfaces with the storage controllers 110a and 110b to access underlying data in the volumes 112a and 112b of FIG. 1. The monitoring system 120 and/or components thereof can be implemented on the server 132 or external to the server 132. The console 130 is a type of access point that interfaces with the cluster 102 to support maintenance and diagnostic actions. The console 130 is a computer system that can include a graphical user interface (GUI) and/or a command line interface to issue commands to the storage controllers 110 and access the volumes 112. Although not depicted in FIG. 1, it will be understood that the second site 106 may also include instances of the server 132, the monitoring system 120, and one or more networks 126 interfacing to access points 128 and console 130.

Figure 2:
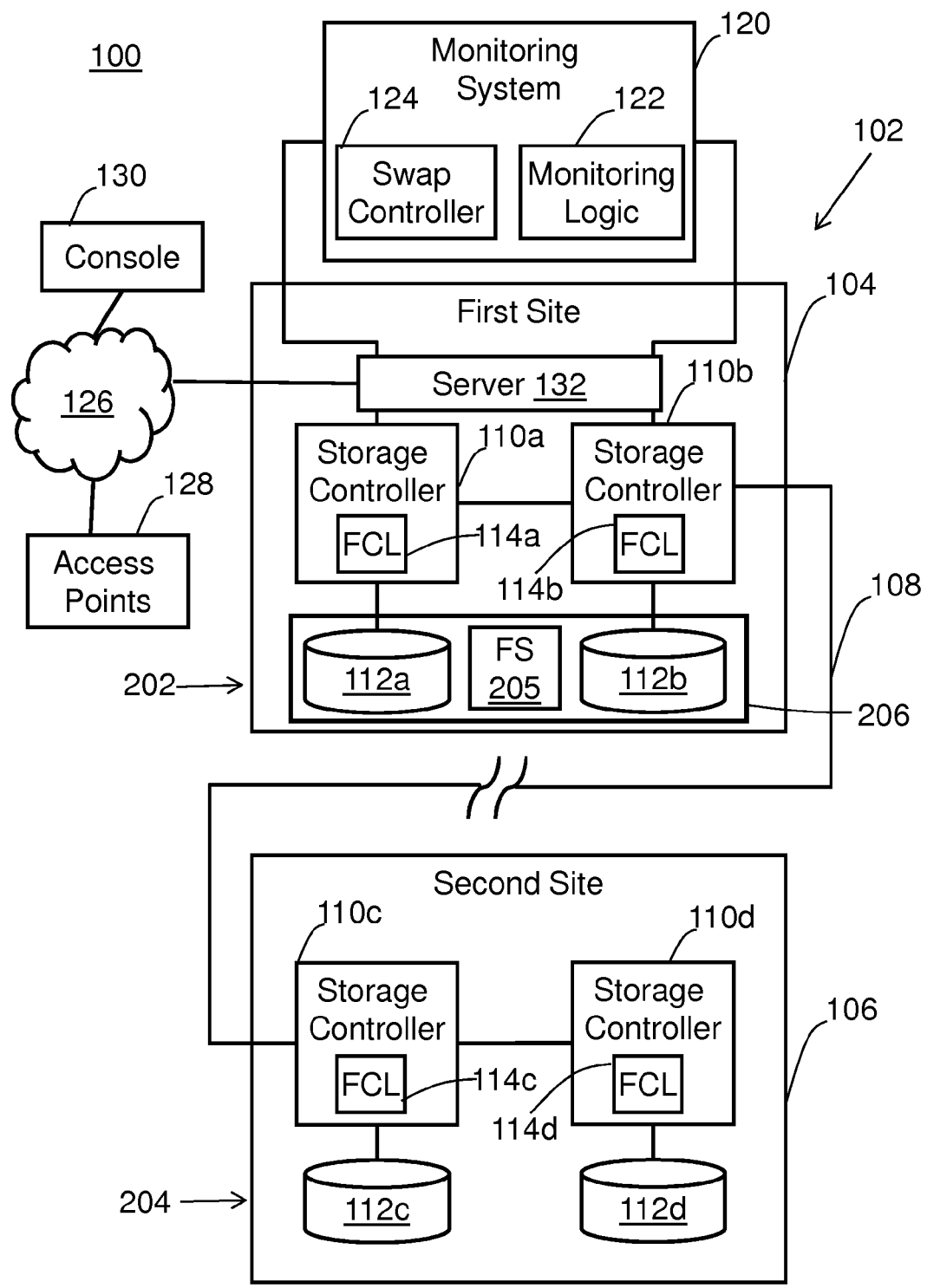
FIG. 2 depicts a block diagram of the cluster of FIG. 1 after a swap according to an embodiment.

FIG. 2 depicts the cluster 102 after a swap according to an embodiment. When a planned or unplanned swap occurs, the primary volumes 116 of the first site 104 of FIG. 1 become former primary volumes 202, and the secondary volumes 118 of the second site 106 of FIG. 1 become new primary volumes 204. At the time of switchover, the FCL 114a and the FCL 114b receive a fence command to block access to the volumes 112a and 112b as fenced volumes 206.

One or more application programming interfaces (APIs) of the cluster 102 are extended to include fence and unfence commands. Fence and unfence commands can also be received using a command line interface or a GUI. Fence and unfence commands can be initiated by the monitoring system 120, the console 130, or another application or system. A fenced state 205 in the cluster 102 can be used to establish whether fencing is active or inactive. While fencing is active, read and write access to the fenced volumes 206 is prevented.

When any maintenance or repair actions are completed on the former primary volumes 202, the first site 104 and the second site 106 are resynchronized such that the first site 104 becomes a secondary system for the new primary volumes 204 at the second site 106. An unfence command may be received as part of system resynchronization or to support maintenance actions. A resynchronize operation can automatically clear the fenced state 205 without issuing a separate unfence command. In response to an unfence command, issued either directly or indirectly at the FCL 114a and/or the FCL 114b, the fencing is removed and access to the former primary volumes 202 is restored.

The fence and unfence commands can also include a parameter such as a bit map that identifies one or more specific volumes 112 to fence or unfence. Accordingly, commands to establish and release the fenced volumes 206 can be managed at an individual or group/subsystem level.

A planned swap or disk switch can occur based on a command or script that forces the secondary volumes 118 of FIG. 1 to become new primary volumes 204, and the primary volumes 116 of FIG. 1 to become former primary volumes 202. An unplanned swap or disk switch can occur when a problem accessing data on the primary volumes 116 of FIG. 1 is detected. The swap controller 124 can be HyperSwap* function enabled and support swaps or switchovers using known HyperSwap techniques to quiesce I/O activity, failover to make the secondary volumes 118 of FIG. 1 become the new primary volumes 204, swap underlying support infrastructure, and resume I/O activity at the new primary volumes 204. Initiation of fencing of the former primary volumes 202 can be performed as part of the swap or when specifically requested. Unfencing of the former primary volumes 202 is performed as part of a resynchronize operation or when specifically requested.

When fencing is active, the fenced volumes 206 may return a unique sense code upon read and write access attempts. Any system attempting to perform an initial program load, i.e., a boot operation, using the fenced volumes 206 will be blocked. Application-level disk read and write requests to the fenced volumes 206 will be blocked as well. Fencing persists such that the fenced volumes 206 will remain fenced until an unfence command is received or a resynchronize operation is performed. For instance, the fenced state 205 can be stored in non-volatile memory to survive a variety of reset conditions, such as a power-on reset, a power supply reset, and other reset conditions. In the event of an unplanned swap, such as a failure condition, if an attempt to activate fencing is unable to complete, the cluster 102 may continue to attempt periodic fence commands in case the failure is based on a temporary condition.

Figure 3:
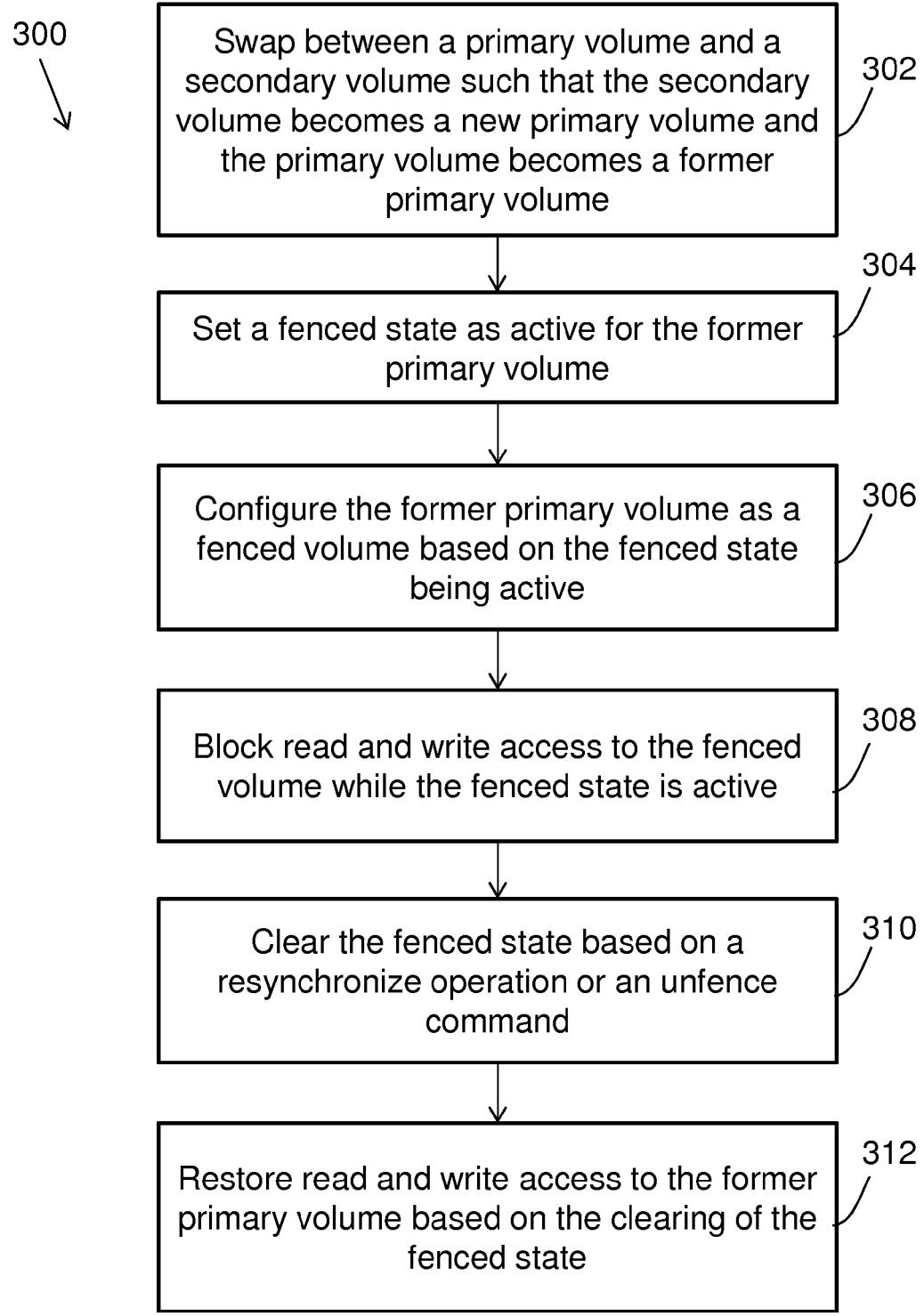
FIG. 3 depicts a flow diagram for protecting former primary volumes in a synchronous replication relationship according to an embodiment.

Turning now to FIG. 3, a flow diagram of a process 300 for protecting a former primary volume in a synchronous replication relationship will be described in an exemplary embodiment. The process 300 is described in reference to FIGS. 1 and 2 and can be implemented by the system 100 of FIG. 1. While the process 300 refers to singular volumes, it will be understood that the process 300 can be applied to one or more volumes.

At block 302, a swap between a primary volume 116 at a first site 104 and a secondary volume 118 at a second site 106 is initiated such that the secondary volume 118 becomes a new primary volume 204 and the primary volume 116 becomes the former primary volume 202. The swap can be initiated as a planned swap or an unplanned swap. For example, the swap can be an unplanned swap initiated by monitoring system 120 in response to the monitoring system 120 detecting a failure condition associated with the primary volume 116. Alternatively, the swap may be planned based on a scheduled maintenance action associated with a storage controller 110 or other factors.

At block 304, a fenced state 205 is set as active for the former primary volume 202. At block 306, the former primary volume 202 is configured as a fenced volume 206 based on the fenced state 205 being active. The former primary volume 202 can be identified to be configured as the fenced volume 206 based on a parameter received with a fence command. Fence commands and unfence commands are accessible through one or more application programming interfaces, command line interfaces or GUIs using direct commands, scripts, or options associated with other commands or scripts. The cluster 102 may also perform a check to determine whether configuring of the former primary volume 202 as the fenced volume 206 was successful. If the configuring was unsuccessful, the cluster 102 can periodically reattempt to configure the former primary volume 202 as the fenced volume 206.

At block 308, the fencing control logic 114 blocks read and write access to the fenced volume 206 while the fenced state 205 is active. The fencing control logic 114 can return a unique sense code upon an access attempt to the fenced volume 206 while the fenced state 205 is active.

At block 310, the fenced state 205 is cleared based on a resynchronize operation or an unfence command. At block 312, the fencing control logic 114 restores read and write access to the former primary volume 202 based on the clearing of the fenced state 205.

Figure 4:
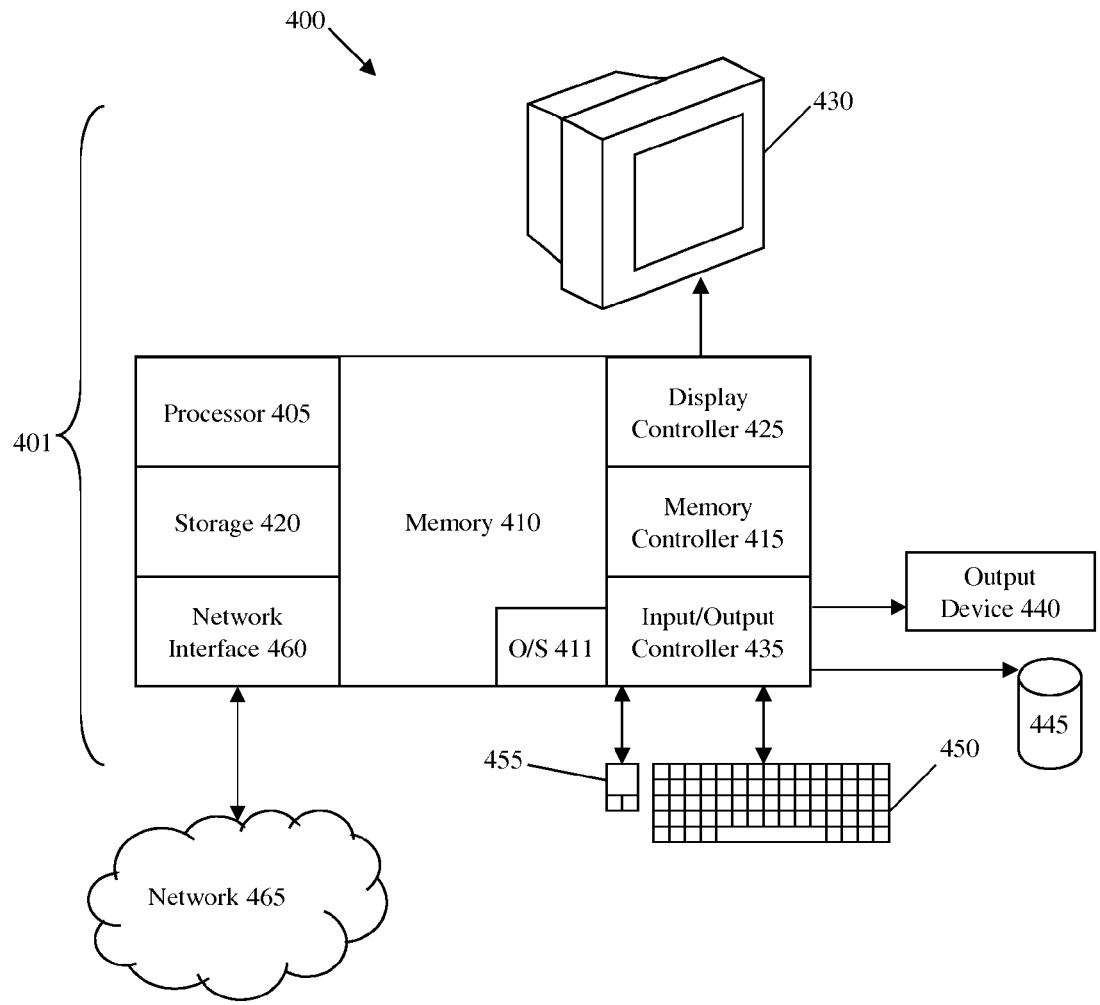
FIG. 4 depicts a computer system that can be used in embodiments.

FIG. 4 depicts a block diagram of a system 400 for commanding or implementing fencing in a cluster, which may be in a GDPS environment. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 400 therefore includes general-purpose computer 401 as illustrated in FIG. 4. The example computer 401 may represent computing resources in one or more of the storage controller 110, monitoring system 120, access points 128, console 130, server 132, and/or other computer system in the cluster 102 of FIG. 1.

In an exemplary embodiment, in terms of hardware architecture, as shown in FIG. 4, the computer 401 includes a processor 405 which is a processing circuit that may command or implement fencing and/or unfencing in the system 100 of FIG. 1. The computer 401 further includes memory 410 coupled to a memory controller 415, and one or more input and/or output (I/O) devices 440, 445 (or peripherals) that are communicatively coupled via a local input/output controller 435. The input/output controller 435 can be, for example but not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 405 is a hardware device for executing software, particularly that stored in storage 420, such as cache storage, or memory 410. The processor 405 can be any custom made or commercially available processor, a central processing unit (CPU), an auxiliary processor among several processors associated with the computer 401, a semiconductor based microprocessor (in the form of a microchip or chip set), a macroprocessor, or generally any device for executing instructions.

The memory 410 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, and/or other types of storage media. Note that the memory 410 can have a distributed architecture, where various components are situated remote from one another, but can be accessed by the processor 405.

The instructions in memory 410 may include one or more separate programs, each of which comprises an ordered listing of executable instructions for implementing logical functions. In the example of FIG. 4, the instructions in the memory 410 can include a suitable operating system (OS) 411. The operating system 411 essentially controls the execution of other computer programs and provides scheduling, input-output control, file and data management, memory management, and communication control and related services.

In an exemplary embodiment, a conventional keyboard 450 and mouse 455 can be coupled to the input/output controller 435. Other output devices such as the I/O devices 440, 445 may include input devices, for example but not limited to a printer, a scanner, microphone, and the like. Finally, the I/O devices 440, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 400 can further include a display controller 425 coupled to a display 430. In an exemplary embodiment, the system 400 can further include a network interface 460 for coupling to a network 465. The network 465 can be an IP-based network for communication between the computer 401 and any external server, client and the like via a broadband connection. The network 465 transmits and receives data between the computer 401 and external systems. In an exemplary embodiment, network 465 can be a managed IP network administered by a service provider. The network 465 may be implemented in a wireless fashion, e.g., using wireless protocols and technologies, such as WiFi, WiMax, etc. The network 465 can also be a packet-switched network such as a local area network, wide area network, metropolitan area network, Internet network, or other similar type of network environment. The network 465 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 401 is a PC, workstation, intelligent device or the like, the instructions in the memory 410 may further include a basic input output system (BIOS) (omitted for simplicity). The BIOS is a set of essential software routines that initialize and test hardware at startup, start the OS 411, and support the transfer of data among the hardware devices. The BIOS is stored in ROM so that the BIOS can be executed when the computer 401 is activated.

When the computer 401 is in operation, the processor 405 is configured to fetch and execute instructions stored within the memory 410, to communicate data to and from the memory 410, and to generally control operations of the computer 401 pursuant to the instructions.

In an exemplary embodiment, when implemented in hardware, the methods described herein, such as process 300 of FIG. 3, can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects include protecting a former primary volume in a synchronous replication relationship. Blocking read and write access to a former primary volume prevents initial program loads and reliance upon potentially stale data or a possibly failed data source. Blocking access to a former primary volume further ensures that attempted writes to the former primary volume do not succeed, as data written to the former primary volume may be lost upon resynchronizing with the new primary volume.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible and non-transitory storage medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described. (* GDPS and HyperSwap are trademarks or registered trademarks of International Business Machines Corporation.)

What is claimed:

1. A method for protecting a former primary volume in a synchronous replication relationship, comprising:
    initiating a swap between a primary volume at a first site and a secondary volume at a second site such that the secondary volume becomes a new primary volume and the primary volume becomes the former primary volume;
    setting a fenced state as active for the former primary volume;
    configuring the former primary volume as a fenced volume based on the fenced state being active; and
    blocking read and write access to the fenced volume while the fenced state is active.

2. The method of claim 1, further comprising:
    clearing the fenced state based on one of: an unfence command and a resynchronize operation; and
    restoring read and write access to the former primary volume based on the clearing of the fenced state.

3. The method of claim 2, wherein a fence command and the unfence command are accessible through one or more of: an application programming interface, a command line interface, and a graphical user interface.

4. The method of claim 1, further comprising:
    identifying the former primary volume to be configured as the fenced volume based on a parameter received with a fence command.

5. The method of claim 1, wherein the swap is initiated as one of: a planned swap and an unplanned swap.

6. The method of claim 1, further comprising:
    returning a unique sense code upon an access attempt to the fenced volume while the fenced state is active.

7. The method of claim 1, further comprising:
    determining whether the configuring of the former primary volume as the fenced volume was successful; and
    periodically reattempting to configure the former primary volume as the fenced volume based on determining that the configuring was unsuccessful.

8. The method of claim 1, wherein the fenced state is persistent through a reset condition.

9. A system protecting a former primary volume in a synchronous replication relationship, comprising:
    a storage controller at a first site coupled to a primary volume designated as the former primary volume upon a swap to a secondary volume at a second site; and
    fencing control logic configured to establish the former primary volume as a fenced volume based on a fenced state being active, and further configured to block read and write access to the fenced volume while the fenced state is active.

10. The system of claim 9, wherein the fencing control logic is further configured to clear the fenced state based on one of: an unfence command and a resynchronize operation, and to restore read and write access to the former primary volume based on the clearing of the fenced state.

11. The system of claim 10, wherein a fence command and the unfence command are accessible through one or more application programming interfaces of the geographically dispersed parallel systems complex.

12. The system of claim 9, wherein the fencing control logic is further configured to identify the former primary volume to be configured as the fenced volume based on a parameter received with a fence command.

13. The system of claim 9, wherein the fencing control logic is further configured to return a unique sense code upon an access attempt to the fenced volume while the fenced state is active.

14. The system of claim 9, wherein system is further configured to determine whether configuring of the former primary volume as the fenced volume was successful, and periodically reattempt to configure the former primary volume as the fenced volume based on determining that the configuring was unsuccessful.

15. The system of claim 9, wherein the fenced state is persistent through a reset condition.

16. A computer program product for protecting a former primary volume in a synchronous replication relationship, the computer program product comprising:

a tangible non-transitory storage medium readable by a processing circuit and storing instructions for execution by the processing circuit for performing a method comprising:
setting a fenced state as active for a former primary volume at a first site upon a swap to a secondary volume at a second site;
configuring the former primary volume as a fenced volume based on the fenced state being active; and
blocking read and write access to the fenced volume while the fenced state is active.

17. The computer program product of claim 16, further comprising:
clearing the fenced state based on one of: an unfence command and a resynchronize operation; and
restoring read and write access to the former primary volume based on the clearing of the fenced state.

18. The computer program product of claim 16, further comprising:
identifying the former primary volume to be configured as the fenced volume based on a parameter received with a fence command.

19. The computer program product of claim 16, further comprising:
returning a unique sense code upon an access attempt to the fenced volume while the fenced state is active.

20. The computer program product of claim 16, further comprising:
determining whether the configuring of the former primary volume as the fenced volume was successful; and
periodically reattempting to configure the former primary volume as the fenced volume based on determining that the configuring was unsuccessful.

* * * * *